(12) United States Patent
Smith et al.

(10) Patent No.: US 11,812,456 B2
(45) Date of Patent: Nov. 7, 2023

(54) INTERFERENCE AVOIDANCE BASED ON MULTIPLE OUTER LOOP LINK ADAPTATION (OLLA) PROCESSES

(71) Applicant: Verizon Patent and Licensing Inc., Basking Ridge, NJ (US)

(72) Inventors: Jack Anthony Smith, Melissa, TX (US); Chin Chiu, Allen, TX (US); Mark E. Newbury, Hillsborough, NJ (US); Sachin Vargantwar, Cumming, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 173 days.

(21) Appl. No.: 17/158,446

(22) Filed: Jan. 26, 2021

(65) Prior Publication Data
US 2022/0240257 A1    Jul. 28, 2022

(51) Int. Cl.
*H04W 72/541*    (2023.01)
*H04W 72/0446*   (2023.01)
*H04W 72/12*     (2023.01)
*H04W 72/542*    (2023.01)

(52) U.S. Cl.
CPC ..... *H04W 72/541* (2023.01); *H04W 72/0446* (2013.01); *H04W 72/12* (2013.01); *H04W 72/542* (2023.01)

(58) Field of Classification Search
None
See application file for complete search history.

(56) References Cited

U.S. PATENT DOCUMENTS

| | | | | |
|---|---|---|---|---|
| 2011/0183679 | A1* | 7/2011 | Moon | H04W 72/082 455/450 |
| 2014/0369283 | A1* | 12/2014 | Ge | H04W 72/082 370/329 |
| 2015/0373572 | A1* | 12/2015 | Sahin | H04W 24/10 370/252 |
| 2017/0126298 | A1* | 5/2017 | Einhaus | H04B 7/0632 |
| 2018/0359048 | A1* | 12/2018 | Stephenne | H04L 1/0009 |
| 2019/0150016 | A1* | 5/2019 | Kittichokechai | H04L 1/0018 370/252 |

(Continued)

FOREIGN PATENT DOCUMENTS

| | | | | |
|---|---|---|---|---|
| JP | 2013201575 A | * | 10/2013 | |
| WO | WO-2012037871 A1 | * | 3/2012 | .......... H04W 52/244 |
| WO | WO-2014094293 A1 | * | 6/2014 | .......... H04B 7/0413 |

OTHER PUBLICATIONS

Fu et al., translation of WO2012/037871A1, 2012. (Year: 2012).*
Machine translation of JP2013-201575A (Year: 2013).*

*Primary Examiner* — Faruk Hamza
*Assistant Examiner* — Cassandra L Decker

(57) ABSTRACT

The disclosed embodiments are directed toward improvements in dynamic spectrum sharing (DSS) between cellular network technologies. In one embodiment, a method is disclosed comprising initiating scheduling for a resource in a slot and determining a neighboring base station associated with user equipment (UE). The method then determines a type of interference associated with the neighboring base station and the slot and identifies an outer loop link adaptation (OLLA) value associated with the type of interference. An effective data rate is calculated based on the OLLA value and the method completes scheduling using the effective data rate.

17 Claims, 7 Drawing Sheets

(56) References Cited

U.S. PATENT DOCUMENTS

| | | | |
|---|---|---|---|
| 2019/0253988 A1* | 8/2019 | Khoshnevisan | H04W 52/241 |
| 2020/0137591 A1* | 4/2020 | Smith | H04W 72/085 |
| 2020/0314706 A1* | 10/2020 | Xing | H04B 7/0632 |
| 2020/0366403 A1* | 11/2020 | Nammi | H04L 1/1864 |
| 2022/0086844 A1* | 3/2022 | Rassam | H04L 5/0048 |
| 2022/0256387 A1* | 8/2022 | Xiao | H04L 5/0062 |

* cited by examiner

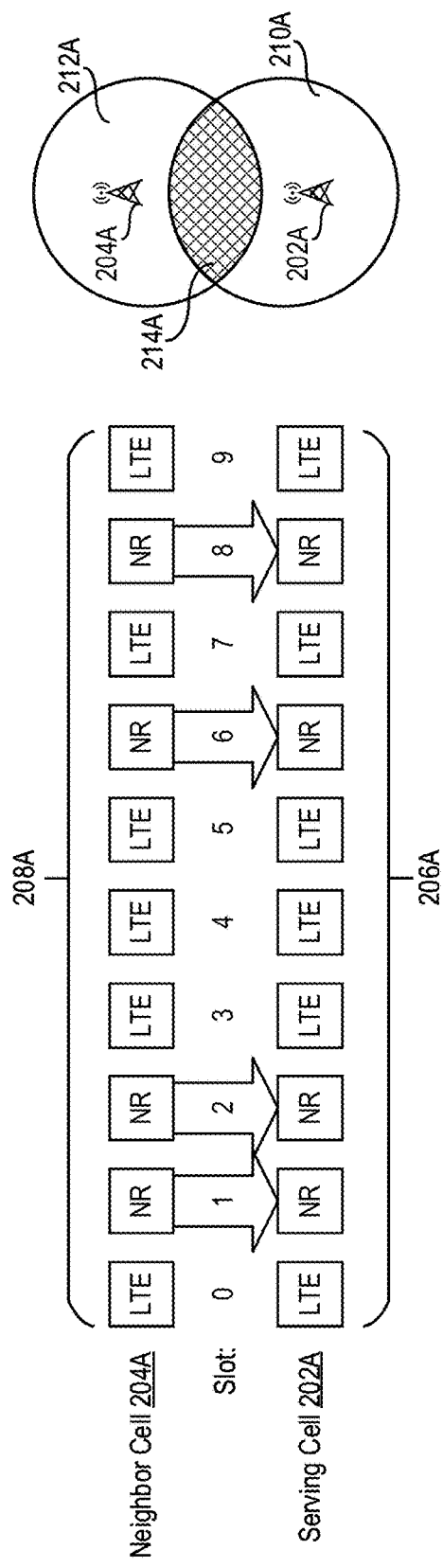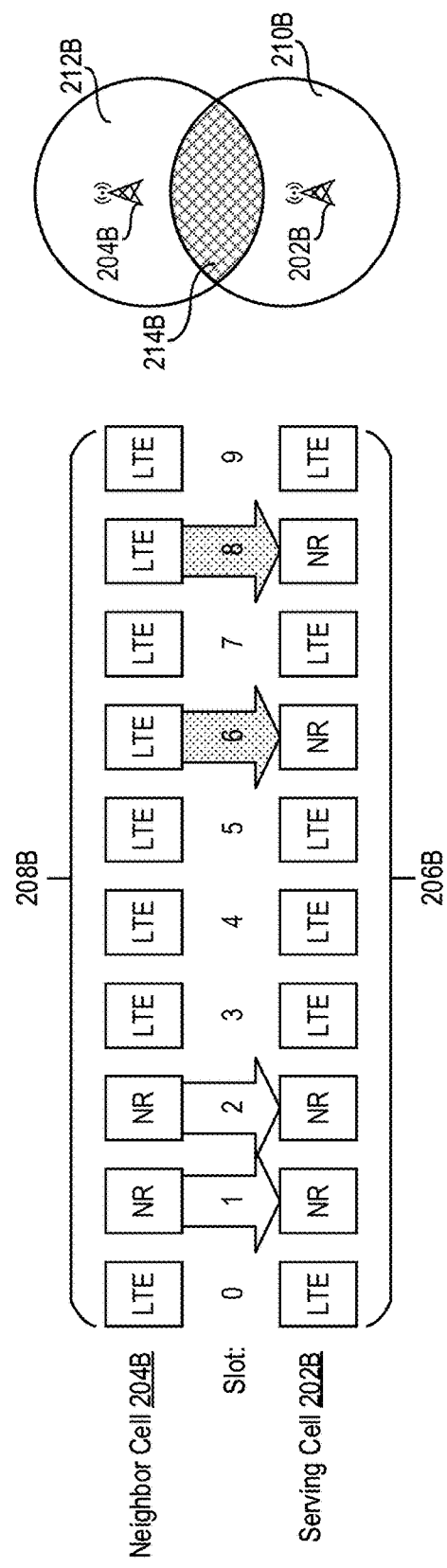
FIG. 2A
FIG. 2B

INTERFERENCE AVOIDANCE BASED ON MULTIPLE OUTER LOOP LINK ADAPTATION (OLLA) PROCESSES

BACKGROUND INFORMATION

Cellular networks may support both 4G and 5G air interfaces via dynamic spectrum sharing (DSS). While DSS enables limited spectrum to be shared efficiently by both 4G and 5G networks, it results in conflicting network transmission across a coverage area. For example, neighboring base stations may be operating disparate networks. As a result, interference across network types occurs and cannot adequately be compensated for by existing techniques.

BRIEF DESCRIPTION OF THE DRAWINGS

FIG. 2A is a block diagram illustrating two base stations configured with the same DSS ratio according to some embodiments of the disclosure.

FIG. 2B is a block diagram illustrating two base stations configured with different DSS ratios according to some embodiments of the disclosure.

DETAILED DESCRIPTION OF EXAMPLE EMBODIMENTS

Figure 1:
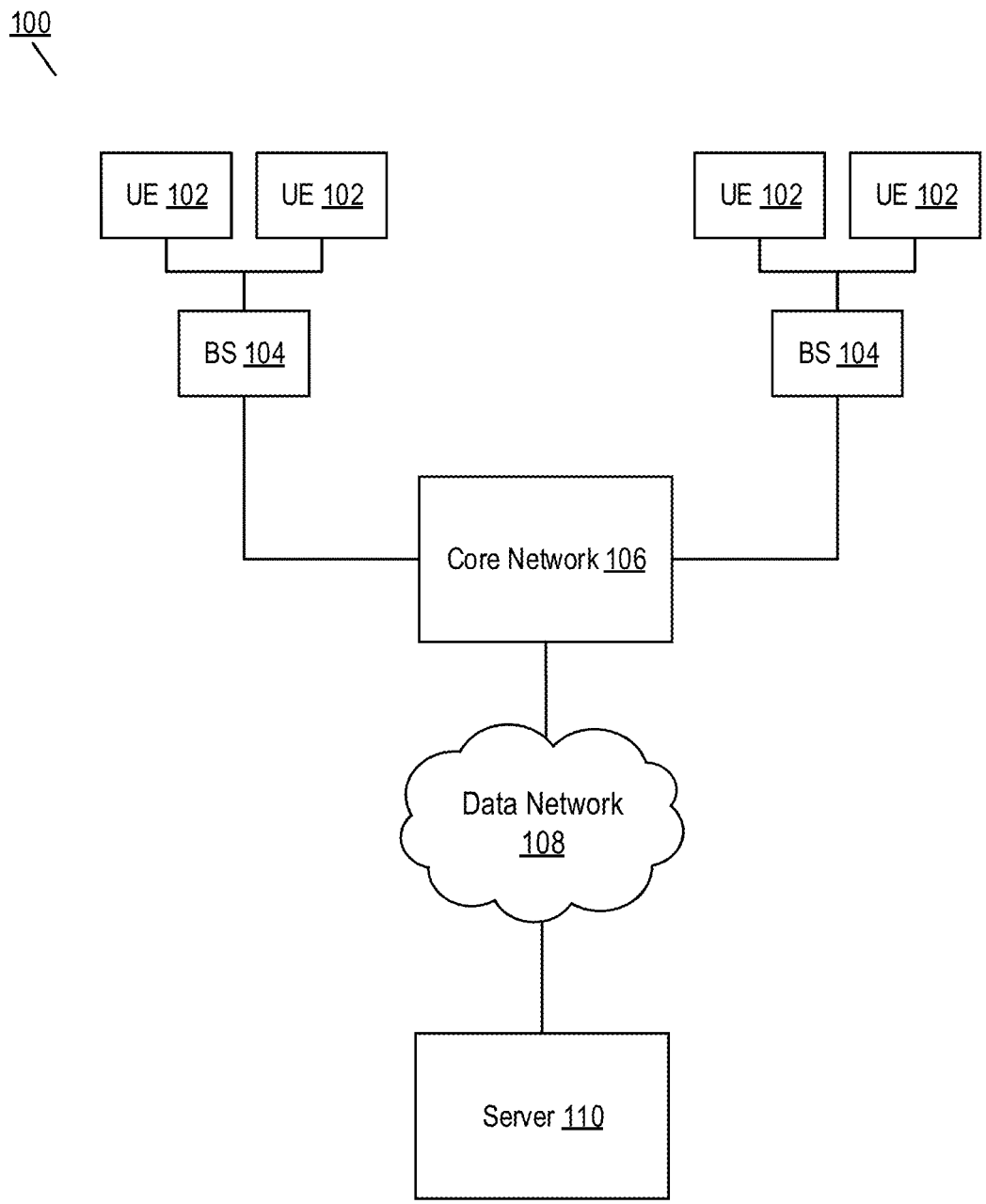
FIG. 1 is a block diagram illustrating a cellular network according to some embodiments of the disclosure.

Link adaptation can be used in cellular networks (e.g., 4G or 5G cellular networks) to dynamically select a suitable modulation and coding scheme (MCS) used to communicate with user equipment (UE). UEs provide channel quality measurements and report these measurements to base stations in the cellular networks. The base station, in turn, selects an MCS based on the reported channel quality. In general, each UE is assigned an MCS based on its own determined channel quality. As the UE receives data from a base station, it returns messages to the base station in the form of a positive acknowledgment (ACK) or negative acknowledgment (NACK) messages, collectively referred to as acknowledgements. For example, when implementing a hybrid automatic repeat request (HARQ) error control protocol, a UE may transmit an ACK message to a base station after successfully decoding a data transmission. Conversely, the UE may issue a NACK message if it is unable to decode the last data transmission.

An outer loop link adaptation (OLLA) process can be used at the base station to adjust the UE reported channel quality in a manner that results in a certain desired percentage of data transmissions being able to be successfully decoded by the UE on the first transmission attempt. In an OLLA process, a variable value is managed for each UE that is used to dynamically alter the selected MCS. One skilled in the art will recognize that this alteration can occur at several different points in the MCS selection process. For example, the variable value can be defined such that it is used to augment the actual channel quality value that is reported by the UE, or it can be used to augment a modified (e.g., filtered) version of the channel quality value, or it can be used to augment the MCS that is selected based on the reported or modified channel quality report. All of these methods are covered under various embodiments of the proposed methodology, but for simplicity, the remaining description refers simply to modifying or determining the MCS to use when transmitting to the UE.

In current systems, a single OLLA value is used to determine which MCS to use when transmitting to the UE. However, such a system fails to account for the type of interference that negatively impacts channel quality. In a cellular network that implements only Long-Term Evolution (LTE) standards, interference can be remedied via various standardized protocols. However, when a cellular network implements both LTE and New Radio (NR) networks, interference between different network types (and between simultaneously operating NR networks) cannot readily be addressed by current OLLA systems.

To solve this problem, the disclosed embodiments describe the use of multiple OLLA values that are associated with specific interference types. A base station is configured to adjust the MCS by first determining what interference the UE is experiencing and then selecting the corresponding OLLA value that matches the interference type. Base stations coordinate their network utilization via interference data structures (e.g., bitmaps), which can be used to compute the type of interference a UE experiences at any given moment.

In one embodiment, the disclosure provides methods, devices, and computer-readable media for implementing a multiple OLLA system. A serving base station can initiate the scheduling of a resource element in a given time slot. Next, the serving base station will determine a neighboring base station associated with user equipment (UE) that will receive the resource element. The serving base station also identifies a type of interference associated with the neighboring base station and the slot. Using the type of interference, the serving base station next identifies an outer loop link adaptation (OLLA) value associated with the type of interference. Based on this OLLA value, which is tied to the type of interference, the serving base station will calculate an effective data rate based on the OLLA value. Finally, the serving base station will complete the scheduling using the effective data rate.

In one embodiment, the type of interference can be New Radio (NR) to NR interference, Long-Term Evolution (LTE) to NR interference, or NR to LTE interference. In some embodiments, the serving base station can also identify the neighboring base station based on measurement reports data associated with the UE. In some embodiments, the serving base station can further determine the type of interference associated with the neighboring base station by reading an interference data structure (e.g., a bitmap) sent by the neighboring base station. This interference data structure may be periodically transmitted to the serving base station by the neighboring base station and comprises a mapping of time slots to radio technology used (e.g., LTE or NR) and also whether the time slots contain Cell Reference Symbols (CRS) or not. As used herein, a CRS refers to a downlink signal sent from a base station to a UE. CRSs provide amplitude and phase reference for use in channel estimation, they additionally enable a UE to measure the received signal power as a function of frequency and to calculate the channel quality indicators. Frequently CRS signals are boosted, or amplified, relative to other resource elements to ensure delivery. The serving base station may also maintain its own interference data structure and may also transmit that interference data structure to other base stations. Alternatively, or in conjunction with the foregoing, the serving base station can select an interference region based on an data structure representing interference regions between the serving base station and the neighboring base station, the interference region selected based on a detected geometry of the UE. In some embodiments, the sharing ratio of LTE and NR users determine the LTE/NR (or CRS/Non CRS) information within the interference data structure.

In some embodiments, the serving base station computes an adjusted channel quality indicator (CQI) value using the OLLA value and accesses a modulation coding scheme (MCS) table to identify a modulation and coding scheme.

In one embodiment, the serving base station also implements a maintenance algorithm to update the OLLA values for each interference type. In one embodiment, this maintenance algorithm includes receiving an acknowledgment (i.e., an ACK or a NACK) from the UE, the acknowledgment transmitted in response to a data transmission. Next, the algorithm determines a type of interference based on the receipt of the acknowledgment. Finally, the algorithm selects and updates an OLLA set based on the type of interference and the acknowledgement.

FIG. 1 is a block diagram of a cellular network 100 according to some embodiments of the disclosure.

In cellular network (100), UE (102) accesses a data network (108) via one or more base station (BS) devices (104) (individually or collectively BS 104) devices and a core network (106). In the illustrated embodiment, UE (102) comprises any computing device capable of communicating with a BS device (104). As examples, UE (102) can include mobile phones, tablets, laptops, sensors, Internet of Things (IoT) devices, and any other devices equipped with a wireless transceiver. One example of a UE is provided in FIG. 6.

In cellular network (100), BS device (104) forms a network allowing over-the-air network communication with UE (102). In general, BS device (104) is communicatively coupled to the core network (106) and wirelessly coupled to UE (102).

In one embodiment, BS device (104) forms a fifth-generation (5G) cellular access network. In one embodiment, each BS device (104) and UE (102) comprise a NextGen Radio Access Network (NG-RAN). In an embodiment, each BS device (104) comprises a next Generation Node B (gNodeB) base station connected to UE (102) via an air interface. In one embodiment, the air interface comprises an NR air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE (102). The gNodeB can additionally include multiple network interfaces for communicating with the core network (106). In one embodiment, the gNodeB includes an interface to communicate with a mobility manager (e.g., an Access and Mobility Management Function, AMF) and a second interface to communicate with one or more gateway elements in the core network (106) such as a Session Management Function (SMF) for control data or a User Plane Function (UPF) for user data. In one embodiment, the mobility manager manages control plane traffic while the gateway elements manage user data traffic, as will be discussed. In some embodiments, the BS devices (104) are communicatively connected. For example, in a 5G network, individual gNodeB devices can be communicatively coupled via an X2 interface.

In another embodiment, the BS devices (104) comprise a fourth-generation (4G) cellular access network. In some embodiments, the BS devices (104) comprise an LTE access network. In one embodiment, the BS devices (104) and UE (102) comprise an Evolved Universal Mobile Telecommunications System (UMTS) Terrestrial Radio Access Network (E-UTRAN). In an embodiment, each BS device (104) comprises an Evolved Node B (eNodeB) base station connected to UE (102) via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE (102). The eNodeB can additionally include multiple network interfaces for communicating with the core network (106). In one embodiment, the eNodeB includes an interface to communicate with a mobility manager (e.g., a Mobility Management Entity, MME) and a second interface to communicate with one or more gateway elements in the core network (106) such as a Serving Gateway (S-GW) or Packet Data Network Gateway (P-GW). In one embodiment, the mobility manager manages control plane traffic while the gateway elements manage user data traffic, as will be discussed. In some embodiments, the BS devices (104) are communicatively connected. For example, in a 4G network, individual eNodeB devices can be communicatively coupled, for example, via an X2 interface or any other interface.

In an embodiment, the BS devices (104) provide access to a core network (106) to the UE (102). In the illustrated embodiment, the core network (106) can be owned and/or operated by a mobile network operator (MNO) and provides wireless connectivity to UE (102). In the illustrated embodiment, this connectivity can comprise voice and data services. The core network (106) includes various computing devices, which are described briefly herein.

At a high-level, the core network (106) can include a user plane and a control plane. In one embodiment, the control plane comprises network elements and communications interfaces to allow for the management of user connections and sessions. The user plane can comprise network elements and communications interfaces to transmit user data from UE (102) to elements of the core network (106) and to external network-attached elements in a data network (108) such as the Internet. An example of a control plane function comprises authenticating that a user is able to access the core network (106) (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network (106) can include a mobility manager, one or more gateways (e.g., a serving gateway and packet gateway), and a subscriber database. In practice, the core network (106) can include more or less components than these.

In a 5G network, the mobility manager can be implemented by an AMF, SMF, and an Authentication Server Function (AUSF). Specifically, the AMF performs mobility management while the SMF performs session management, both of which are described herein. Further, the AUSF can obtain authentication vectors from a subscriber database. In a 4G network, the mobility manager can be implemented by an MME, a serving gateway by an S-GW, a packet gateway by a P-GW, and a subscriber database by a home subscriber server (HSS).

The serving gateway in a 5G network can be implemented by the SMF as well. Specifically, packet routing from the base station to the packet gateway can be handled by the SMF in contrast to the S-GW in a 4G network. In a 5G network, the packet gateway can be implemented by the UPF, which provides packet routing from the serving gateway to external services and manages Internet Protocol (IP) address allocation as well as content filtering and blocking. In a 5G network, the subscriber database can be implemented by a Unified Data Repository (UDR), which stores the subscriber data. Access to the UDR can be mediated by Unified Data Management (UDM), which is part of the subscriber database, as described herein.

In brief, a UE (102) can communicate with the mobility manager to authenticate and establish a session or bearer with the serving and packet gateways. The mobility manager accesses the subscriber data to confirm the UE (102) identity and communicates with the serving gateway to establish the session. Once established, the UE (102) transmits data requests through the session to the packet gateway, which manages the transmitting and receiving data to and from external network services. Specific details of these elements are provided in the following figures.

Dynamic spectrum sharing (DSS) is a technique for sharing frequency spectrum between two types of wireless networks. For example, DSS can be used to enable 5G radio networks to share frequency spectrum with 4G networks. For example, 5G NR and LTE radio networks can be serviced by the same base station. In some embodiments, DSS can be enabled via a software upgrade that enables the use of 4G and 5G UE in the same frequency band. In a system with DSS enabled, a base station can schedule 4G and 5G slots based on a sharing ratio. For example, a 40% sharing ratio can result in 40% of frequency slots being allocated for 5G NR while the remaining 60% of slots are allocated to LTE. The sharing ratio can be changed semi-dynamically to adjust to the NR and LTE traffic observed in the network. Moreover, the sharing ratio can change the NR/LTE, CRS/Non CRS information transmitted by the interference data structures.

FIG. 2A is a block diagram illustrating two base stations configured with the same DSS ratio according to some embodiments of the disclosure. A mobile network operator (MNO) can configure DSS ratios for each base station independently. In the illustrated embodiment, a serving base station (202A) and a neighboring base station (204A) are illustrated. Further, ten (10) slots (206A, 208A) are illustrated for each base station (202A, 104a). In the illustrated embodiment, slots labeled "NR" refer to 5G NR slots, while slots labeled "LTE" correspond to 4G LTE slots. Alternatively, the interference regions can also be described as "CRS" slots and "Non CRS" slots. The specific network technologies are merely representative, and are not limiting. Other cellular network types can be utilized.

In the illustrated embodiment, slots can be temporally (206A, 208A) situated in a frame. Thus, the left-most slot can comprise the first slot in the series of slots (206A, 208A). The slots (206A, 208A), collectively, can form a radio frame of a fixed or variable length. The specific number of slots (206A, 208A) is exemplary and more or fewer slots can be used. In the illustrated embodiment, both base stations (202A, 104) are configured with a 40% DSS ratio. Thus, four of the ten (10) slots (206A, 208A) service 5G UE, while six of the ten (10) slots (206A, 208A) service LTE UE. Specifically, in the illustrated embodiment, slots 1, 2, 6, and 8 service 5G UE while slots 0, 3-5, 7, and 9 service 4G UE. In the illustrated embodiment, a mapping of slots (e.g., slot 1 of slots 206A and slot 1 of slots 208A) are referred to as an interference region.

In the illustrated embodiment, interference can occur in any slot, however the type of interference differs based on the radio technology used. For example, in slot 0, LTE-LTE interference can occur. Similarly, in slot 1, NR-NR interference can occur. In general, interference arises in a boundary region between base stations. In the cutaway, coverage areas (210A, 112a) of the base stations (202A, 104a) are illustrated. In regions (210A, 112a), a UE generally experiences less significant interference with a neighboring cell. That is, a UE in a first region (210A) experiences less significant interference from signals of the neighboring base station (204A) while a UE in a second region (212A) experiences less significant interference from signals of the serving base station (202A).

However, in a boundary region (214A), a UE can experience interference from the neighboring base station (204A). If both cells are in an LTE time slot, the interference in region (214A) is referred to as LTE-LTE interference. In general, LTE-LTE interference can be caused primarily by CRS signals transmitted at regular intervals in a subframe or slot. Thus, LTE slots may be referred to as "CRS slots" while the remaining slots may be referred to as "non-CRS slots." In general, CRS signals are boosted compared to other signals in an LTE radio frame. For example, CRS signals can be boosted by three to six decibels relative to the other signals in the frame. In general, 4G UE have been designed to compensate for this LTE-LTE interference. Similar to the foregoing, if both cells are in an NR time slot, the interference in region (214A) is referred to as NR-NR interference. As with LTE-LTE interference, in NR-NR interference UEs can share the same frequency blocks and thus cause interference among UEs.

FIG. 2B is a block diagram illustrating two base stations configured with different DSS ratios according to some embodiments of the disclosure. In the illustrated embodiment, a neighboring base station (204B) and a serving base station (202B) can be configured with different DSS ratios. Specifically, the serving base station (202B) is configured with a 40% DSS ratio while the neighboring base station (204B) is configured with a 20% DSS ratio. In the illustrated embodiment, slots 0-5, 7, and 9 in slots (206B, 108b) exhibit the same interference as the interference discussed in slots (206A, 208A) due to matching technologies used by both base stations (202B, 104b).

Figure 7:
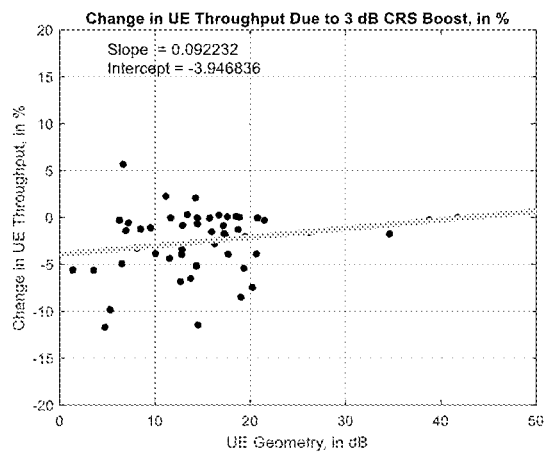
FIG. 7 is a diagram illustrating the effects of cell reference signal boosting according to some embodiments of the disclosure.
Figure 7:
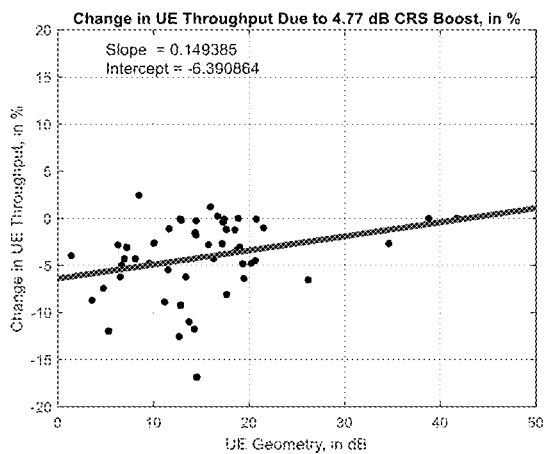
Figure 7:
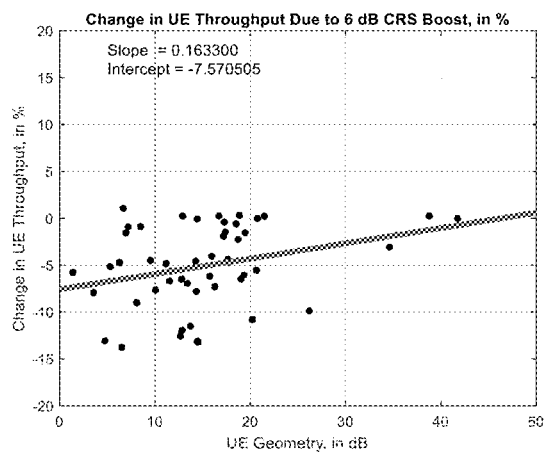

However, in the illustrated embodiment of FIG. 2B, slots 6 and 8 exhibit conflicting technology interference. This interference is referred to as LTE-NR or NR-LTE interference, the ordering based on whether the UE is attempting to connect via LTE or NR. Generally, LTE-NR and NR-LTE interference are referred to as LTE-NR interference unless a distinction is necessary. Specifically, the serving base station (202B) is serving 5G NR traffic in slots 6 and 8 while the neighboring base station (204B) is severing 4G LTE traffic. As a result, Ues in boundary region (214B) experience LTE-NR interference. As one example of LTE-NR interference, in the illustrated embodiment the CRS signals in LTE slot 6 of neighboring base station (204B) are amplified by a preset decibel level. As a result, these CRS signals can drastically interfere with 5G signaling between 5G Ues and the serving base station (202B). At lower decibel levels, this interference can only affect Ues in a smaller boundary region (214B), leaving Ues in regions (210B, 112b) unaffected. However, as the amplification is increased, the boundary region (214B) will expand, impacting more Ues in regions (210B, 112b). For example, during experimentation of a two-cell system both system-level and individual-UE throughput were reduced due to CSR boosting. At a system level, the overall throughput of the system declined by 2.38%, 3.79%, and 5.13% when the CSR signals were boosted by 3 dB, 4.77 dB, and 6 dB, respectively. Further, the individual effects on UE were greater, especially for low-geometry Ues. For example, a near-zero geometry UE experienced 3.94%, 6.39%, and 7.57% average decreases at 3 dB, 4.77 dB, and 6 dB, respectively. However, some individual Ues experienced an approximately 15% decrease in throughput due to CRS boosting. Full results of the experiment are provided in FIG. 7 and summarized in the following Table 1:

TABLE 1

Average Decrease in Throughput as a Function of UE Geometry and CRS Boosting

| Geometry (dB) | CRS Boosting | | |
|---|---|---|---|
| | 3 dB | 4.77 dB | 6 dB |
| 0 | −3.94684 | −6.39086 | −7.57051 |
| 10 | −3.02452 | −4.89701 | −5.93751 |
| 20 | −2.1022 | −3.40316 | −4.30451 |
| 30 | −1.17988 | −1.90931 | −2.67151 |
| 40 | −0.25756 | −0.41546 | −1.03851 |
| 50 | 0.664764 | 1.078386 | 0.594495 |

In another embodiment, CRS interference can be present regardless of the technology. For example, in the case of a DSS rate matching method, CRS signals are available for both NR and LTE subframes (and even in timeslots with a mixture of both NR and LTE resource block groups). Therefore, an interference region can also be defined based on the CRS in a time slot. The primary interfering cell can use either a non-MBSFN (CRS) timeslot or a MBSFN (non-CRS) timeslot, Likewise, the serving cell can use either a non-MBSFN (CRS) timeslot or a MBSFN (non-CRS) timeslot, Therefore, the interference regions can be with CRS-CRS, Non-CRS-CRS, CRS-Non-CRS and Non-CRS-Non-CRS.

While various techniques have been implemented to address LTE-LTE interference, no agreed-upon solution has been identified to solve the problems of NR-NR interference. The disclosed embodiments additionally provide techniques for addressing NR-NR interference along with NR-LTE and LTE-NR interference. The techniques also address "CRS-CRS" interference, "CRS-non CRS" interference, and "non CRS-non CRS" interference.

Figure 3:
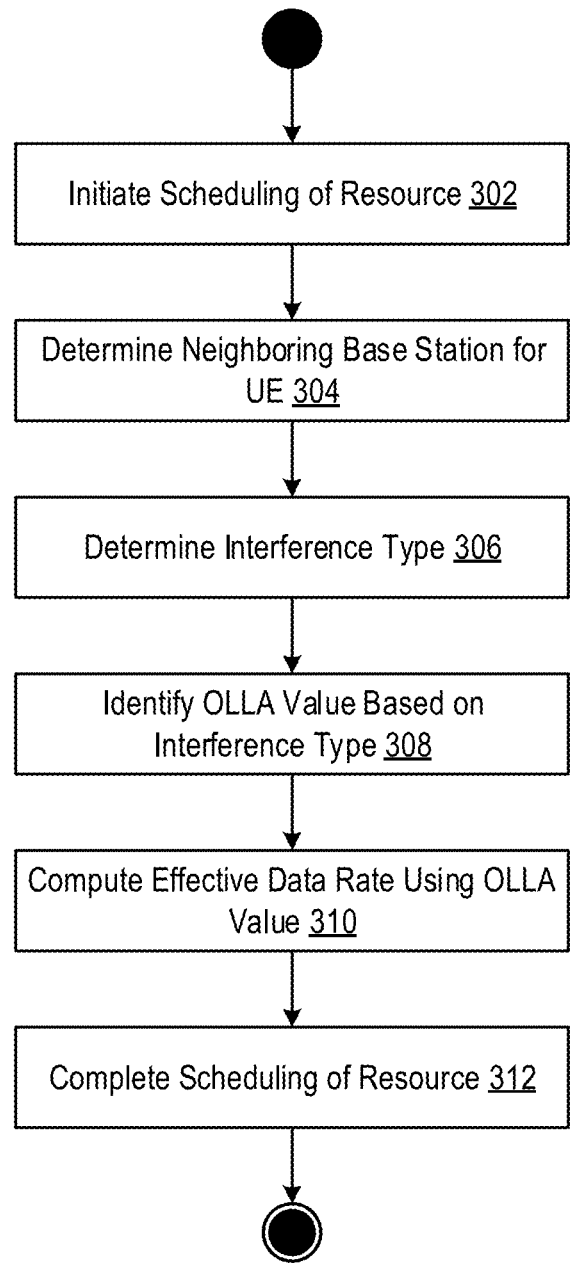
FIG. 3 is a flow diagram illustrating a method for scheduling a resource in a cellular network according to some embodiments of the disclosure.

FIG. 3 is a flow diagram illustrating a method for scheduling a resource in a cellular network according to some embodiments of the disclosure.

In step 302, the method can comprise initiating scheduling of a resource. In one embodiment, a resource can comprise a resource element. In one embodiment, a resource element comprises a data carrier for a radio frame (e.g., an LTE or NR frame). In the illustrated embodiment, scheduling can refer to downlink scheduling performed at a base station such as an eNodeB or gNodeB in a 4G or 5G network, respectively. Various scheduling algorithms can be used, such as best channel quality indicator (CQI) scheduling, proportional fair scheduling, maximum throughput scheduling, or other similar scheduling routines. As will be discussed, regardless of the specific scheduling routine, the method in FIG. 3 computes a dynamic effective data rate to use during scheduling.

In step 304, the method can comprise identifying a neighboring base station. In the illustrated embodiment, the method can be implemented by a base station, referred to as the serving base station. A neighboring base station can refer to any other base station. In one embodiment, the neighboring base station can comprise a primary interfering base station. In one embodiment, a primary interfering base station can comprise a base station that interferes the most with the serving base station.

In one embodiment, the method can utilize measurement reports transmitted by UE to determine a neighboring base station. In one embodiment, the measurement reports can include Reference Signal Received Power (RSRP) data transmitted by a UE to the serving base station. In one embodiment, the UE transmits the highest two RSRP values at any given instance as well as identifiers to the base stations associated with the RSRP values. Other amounts can be transmitted. The method can filter the RSRP values to remove the RSRP value associated with itself and then select the highest RSRP value to identify the largest interfering cell. The foregoing is exemplary, other techniques can be used. For example, the UE can transmit a measurement report to the serving base station which includes similar information that allows the base station to identify the primary interfering base station.

In step 306, the method determines the interference type generated by the primary interfering base station.

As a preliminary step, the method can first determine what type of cellular data is to be transmitted to UE. In one embodiment, the method can determine, based on the UE and the timing, whether the transmission comprises an LTE or NR transmission. Next, the method can query or read an interference data structure associated with the primary interfering base station. In one embodiment, the method can periodically receive interference data structures from other base stations. These interference data structures can provide a map of slots to cellular transmission types. For example, slots (208A) can comprise an interference data structure of the neighboring base station (204A) that maps slots 0 through 9 to LTE or NR transmission types. Thus, for example, at slot 0, an interference data structure indicates that the neighboring base station (204A) is transmitting LTE data.

Figure 5:
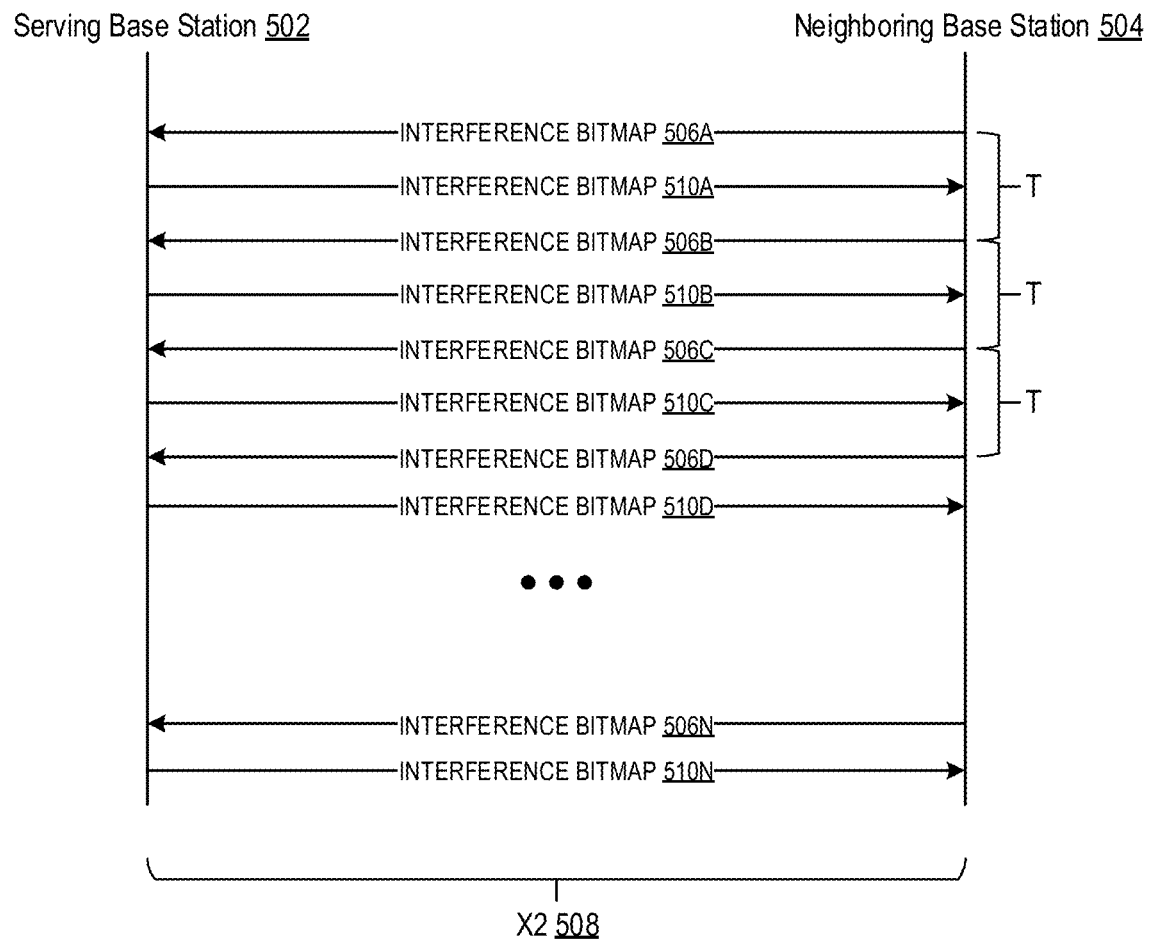
FIG. 5 is a flow diagram illustrating the transmittal of interference data structures between base stations according to some embodiments of the disclosure.

From this interference data structure, the method can determine the type of interference using the cellular transmission type of the neighboring base station and its own corresponding cellular transmission type. As discussed above, this determination may categorize the interference as NR-NR, LTE-LTE, NR-LTE, or LTE-N R. Another determination may categorize the interference as CRS-CRS, CRS-Non CRS, or Non CRS-Non CRS. The description of FIG. 5 provides further detail regarding the transmittal of interference data structures.

As one example of the types of interference, significant interference may occur when a neighboring base station is transmitting LTE data while a serving base station is transmitting NR data. If the LTE transmission is a Multimedia Broadcast Multicast Services (MBMS) Single-Frequency Network (MBSFN) subframe, no LTE data is carried, and there is little to no interference with a 5G subframe. Specifically, since there are no LTE CRS signals interfering with 5G data, the LTE-NR interference experienced is minimal to negligible. However, in non-MBSFN subframes, boosted CRS values as well as Physical Downlink Shared Channel (PDSCH), alone or combined, can introduce significant interference with 5G subframes. As noted previously, the boosting of CRS signals amplifies this problem, particularly at the edge of a coverage area of a base station.

In step 308, the method identifies an outer loop link adaptation (OLLA) value based on the type of interference.

In one embodiment, the method can determine if the primary interfering cell is operating in LTE mode. If so, the method can load an LTE-NR OLLA value. Alternatively, if the primary interfering cell is operating in NR mode, the method can load an NR-NR OLLA value. In these two scenarios, the method can determine that it is operating in NR mode, however in some embodiments, this determination is implicit. In an alternative embodiment, the method can explicitly determine its operating mode (e.g., NR vs. LTE) and can first check if it is operating in LTE mode. If so, the method can load an LTE-LTE OLLA value of the primary interfering cell is operating in LTE mode or the LTE-NR OLLA value if the primary interfering cell is operating in NR mode. In another embodiment, the method can determine if the primary interfering cell is using a non-MBSFN (CRS) timeslot. If so, the method can load a CRS-CRS OLLA value. Alternatively, if the primary interfering cell is operating in an MBSFN (Non-CRS) timeslot and the serving cell is also using a non-MBSFN (CRS) timeslot, then a Non-CRS-Non-CRS OLLA value is loaded.

In one embodiment, the OLLA value can comprise a numeric value representing the monitored channel conditions of a cellular network. As discussed in FIG. 4, this value may be continuously updated by monitoring CQI values reported by UE. Notably, the method selects an OLLA value that is specific to the type of interference detected. Thus, different types of interferences are associated with different OLLA values and these values are updated independently. In one embodiment, the method can maintain the OLLA values and access them in memory. As will be discussed, in some embodiments, the method can also maintain OLLA mappings that map OLLA values to effective data rates and other MCS parameters.

In step 310, the method can comprise computing an effective data rate using the OLLA value.

In one embodiment, the method can maintain tables for each interference type that maps OLLA values to channel quality parameters. In one embodiment, the method can smooth a CQI value last reported by the UE to obtain a filtered CQI value. In one embodiment, smoothing is implemented to account for random interference and other similar factors. In one embodiment, the method can then add the OLLA value identified in step 308 to the filtered CQI value to obtain an adjusted CQI value. The method then uses the adjusted CQI value to query an MCS table, which maps adjusted CQI values to channel properties. For example, an MCS table may map a CQI value (e.g., 0, 1, 2, 3, etc.) to a modulation type (e.g., QPSK, 16QAM, 64QAM, 256QAM) and a code rate (×1024) (e.g., 78, 120, 192, etc.). In some embodiments, the MCS table may also include a spectral efficiency parameter.

In step 312, the method can then complete the scheduling of the transmission according to the effective data rate obtained in step 310. In one embodiment, the method can transmit the data to the UE and await an ACK or NACK message from the UE. Upon receiving an ACK/NACK, the method can update the OLLA value for the interference type accordingly. Details of this process are described next in the description of FIG. 4.

While the foregoing embodiments emphasize the use of CQI, ACK, and NACK values and similar reporting to compute and use OLLA values, the methods can further utilize a quality-of-service (QoS) of the traffic as well when computing the effective data rate. Specifically, when scheduling a resource element that requires a high quality of service, the method can proactively schedule the transmission during an NR-NR interference period based on the interference data structure. In this manner, the method can ensure minimal interference while providing the highest data rate. In this manner, QoS of the data transmission may be used in step 310 to compute the effective data rate and may be used in step 312 to defer scheduling until an NR-NR interference region is scheduled.

Alternatively, or in conjunction with the foregoing, in bursty traffic conditions, the scheduler may defer scheduling of a user based on the interference type/region (NR-NR, NR-LTE or Non-CRS-Non-CRS, CRS-Non-CRS) to minimize the effect of the interference.

Alternatively, or in conjunction with the foregoing, the method can further include moving higher geometry UEs (i.e., UEs having higher signal-to-interference-plus-noise, SINR, measurements) to NR-LTE interference regions. Specifically, UEs that have SINR measurements are generally closer to a serving base station and thus are not as affected by interference from a neighboring base station. Thus, in step 312, the method can proactively schedule these UEs in an NR-LTE region while scheduling low geometry devices to NR-NR or LTE-LTE regions. Alternatively, or in conjunction with the foregoing, if the method determines that a UE has a high geometry, it may forego transmitting symbols in an NR-NR or LTE-LTE interference region.

In some embodiments, the method can further comprise determining whether a UE has an average geometry (compared to a maximum and minimum detected geometry). In these embodiments, the method can first schedule transmissions in LTE-NR interference regions. After a preconfigured number of HARQ transmissions are detected, the method can then start scheduling transmissions in NR-NR or LTE-LTE interference region to reduce the failed transmissions.

Figure 4:
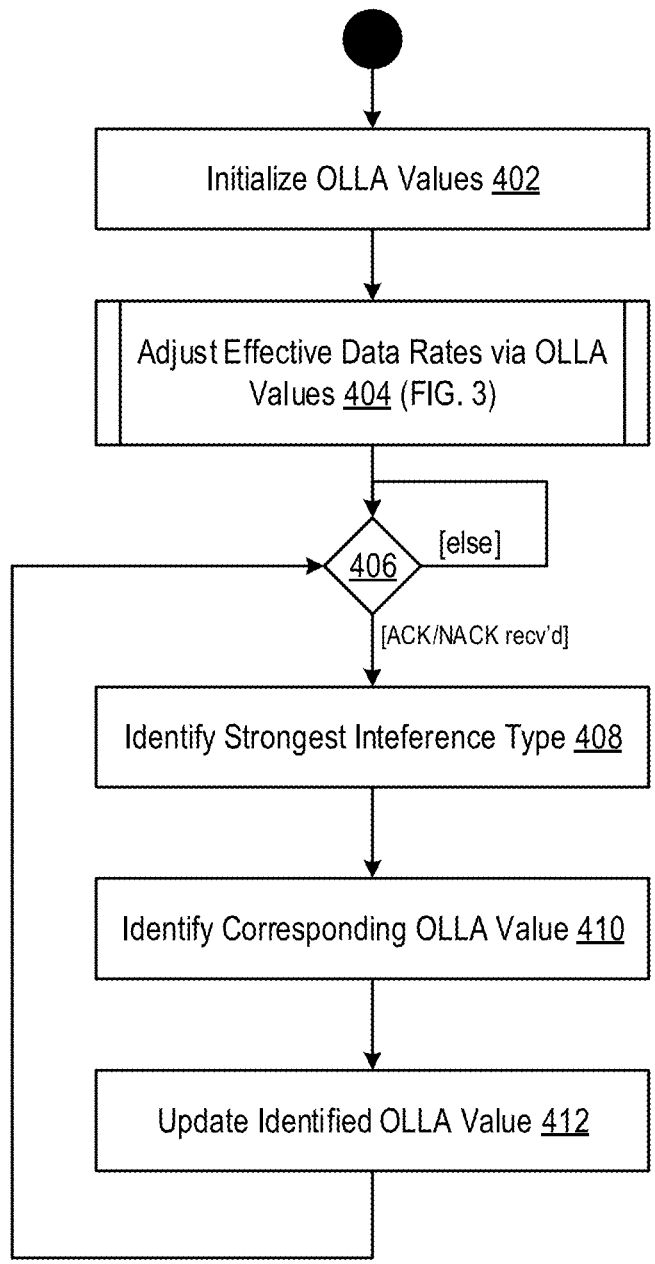
FIG. 4 is a flow diagram illustrating a method for initializing and updating outer loop link adaptation values according to some embodiments of the disclosure.

FIG. 4 is a flow diagram illustrating a method for initializing and updating OLLA values according to some embodiments of the disclosure.

In step 402, the method can comprise initializing OLLA values for each interference type. In one embodiment, the interference types may comprise NR-NR, LTE-LTE, NR-LTE, and LTE-NR interference types (or CRS-CRS, CRS-Non CRS interference types). In one embodiment, in step 402, the method can initialize an OLLA value for each type. In one embodiment, initializing can include setting the OLLA value to zero (e.g., 0 dB).

In one embodiment, the method can execute step 402 periodically, that is, periodically resetting the OLLA values. In another embodiment, the method can set initialize the OLLA values each time a UE connects or hands over to the serving base station implementing the method. In this embodiment, each UE is associated with a set of OLLA values for each type of interference (referred to as an OLLA set) and the OLLA set is initialized to zero values when the UE connects to the serving base station.

In step 404, the method can comprise adjusting the effective data transmission rates for UE based on corresponding OLLA values. In the illustrated embodiment, this process can be performed using the method described in the description of FIG. 3. In one embodiment, at the conclusion of step 404, the method can transmit data to the UE using the calculated effective data rate, the effective data rate determined based on the interference type.

In step 406, the method awaits an acknowledgment ACK or NACK message from the UE. In the illustrated embodiment, the method can await the ACK/NACK message and may perform other processing while awaiting a response.

In step 408, the method can comprise identifying a strongest interference type upon receiving an ACK/NACK in step 406. In one embodiment, the method can maintain a strong interfering type based on the measurement reports data discussed previously in connection with steps 304 and 306, the disclosure of which is not repeated herein.

In step 410, the method can comprise identifying the appropriate OLLA value based on the strongest interference type. As discussed in connection with FIG. 3, the method can maintain a plurality of OLLA values for each type of interference (e.g., NR-NR, LTE-LTE, NR-LTE, LTE-NR). After identifying the interference type, the method can read the currently used OLLA value for that interference type.

In step 412, the method can comprise updating the identified OLLA value based on the ACK/NACK message received in step 406.

In the illustrated embodiment, if the method decides to transmit a packet to that UE, it can further examine the result of the transmission. If the transmission was successfully received by the UE on the first transmission attempt (e.g., based on the ACK/NACK feedback), the method can determine that it isn't being optimistic enough and can then increase the OLLA value by a fixed amount (referred to as Δ/9). By increasing the OLLA value, the method can then attempt an incrementally higher rate on the next transmission, thus improving the system throughput.

Conversely, if the transmission was unsuccessful on the first transmission attempt, the method can determine it is being too optimistic. Because the channel conditions can change rapidly, the method can compensate much more aggressively when the transmission is unsuccessful on the first attempt. Thus, the method can reduce the OLLA value by a much larger amount of Δ.

Notably, in the illustrated embodiment, the OLLA value updated may only be the OLLA value associated with the type of interference detected during data transmission in step 404. Thus, if in step 408, the method detects NR-LTE interference, the method may only update the OLLA value for that interference type and for the UE that experienced the interference.

In the illustrated embodiment, the OLLA value updated in step 412 may be per-UE. In other embodiments, the method may alternatively update other UE OLLA values. For example, the method may proactively determine other UEs that experienced the same type of interference and, optionally, are similarly situated to the UE processed in step 408. The method can then update the OLLA values associated with those matching UE/interference pairs. In one embodiment, the OLLA values may have differing value before updating and the method can increment or decrement each different OLLA value by the same amount. In another embodiment, the method can scale the OLLA values proportionate to their value.

In the illustrated embodiment, the method can continue indefinitely while a base station is operating. In this manner, the method can continuously update OLLA values until powered off. In some embodiments, the method can further include deleting an OLLA value upon detecting a UE handover to a new base station. Thus, when a UE exists the coverage range of the base station executing the method, the method can remove the OLLA value to reduce storage capacity. Thus, in some embodiments, the method may only store OLLA values for those UE within range of the base station coverage area.

In some embodiments, the method can initialize the OLLA values in step 402 to a value other than zero. In one embodiment, the method can maintain a historical mapping of UE locations to OLLA values. For example, when a UE enters the coverage area of a base station, they are likely to experience the greatest interference from a neighboring cell. Thus, the method can comprise calculating a running average of OLLA values used during the initial period of a handover and compute an optimal initial OLLA value to "bootstrap" the process as compared to starting from zero.

FIG. 5 is a flow diagram illustrating the transmittal of interference data structures between base stations according to some embodiments of the disclosure.

In the illustrated embodiment, a neighboring base station (504) communicates with a serving base station (502) over an interface (508). In the illustrated embodiment, the interface (508) comprises an X2 interface. In the illustrated embodiment, the interface (508) comprises an interconnecting interface between two base stations in a cellular network and supports both control and user data transmissions. In general, any interface may be used to connect base stations and the X2 interface, common to LTE networks, is used as an example only. For example, an Xn interface may be used in a 5G network.

In the illustrated embodiment, the neighboring base station (504) periodically transmits interference data structures (506A, 506B, 506C, 506D, . . . 506N) to the serving base station (502). This period is denoted as period T. In one embodiment, the neighboring base station (504) transmits the interference data structures (506A, 506B, 506C, 506D, . . . 506N) to any other adjacent base station (not illustrated), and only a single neighbor is illustrated for exemplary purposes only.

In the illustrated embodiment, the serving base station (502) likewise transmits its own interference data structures (508A, 508B, 508C, 508D, . . . 508N) to the neighboring base station (504). As with the foregoing, the serving base station (502) transmits the interference data structures (508A, 508B, 508C, 508D, . . . 508N) to any other adjacent base station (not illustrated), and only a single neighbor is illustrated for exemplary purposes only. The following description describes the operations of the serving base station (502), however the operations may be performed by all base stations.

As discussed above, the serving base station (502) continuously updates and stores interference data structures received from other base stations, including neighboring base station (504). In one embodiment, the interference data structure comprises a mapping of each unit of measurement to a network used in the unit of measurement. For example, the interference data structure may map time slots to technologies used. An example of this interference data structure is provided in FIGS. 2A and 2B. In one embodiment, the interference data structure maps networks used at a subframe granularity. In other embodiments, the interference data structure maps networks used at a resource block group (RBG) granularity. In essence, the interference data structure depicts the time-frequency domain pattern of network transmission types used by the sending base station.

Figure 6:
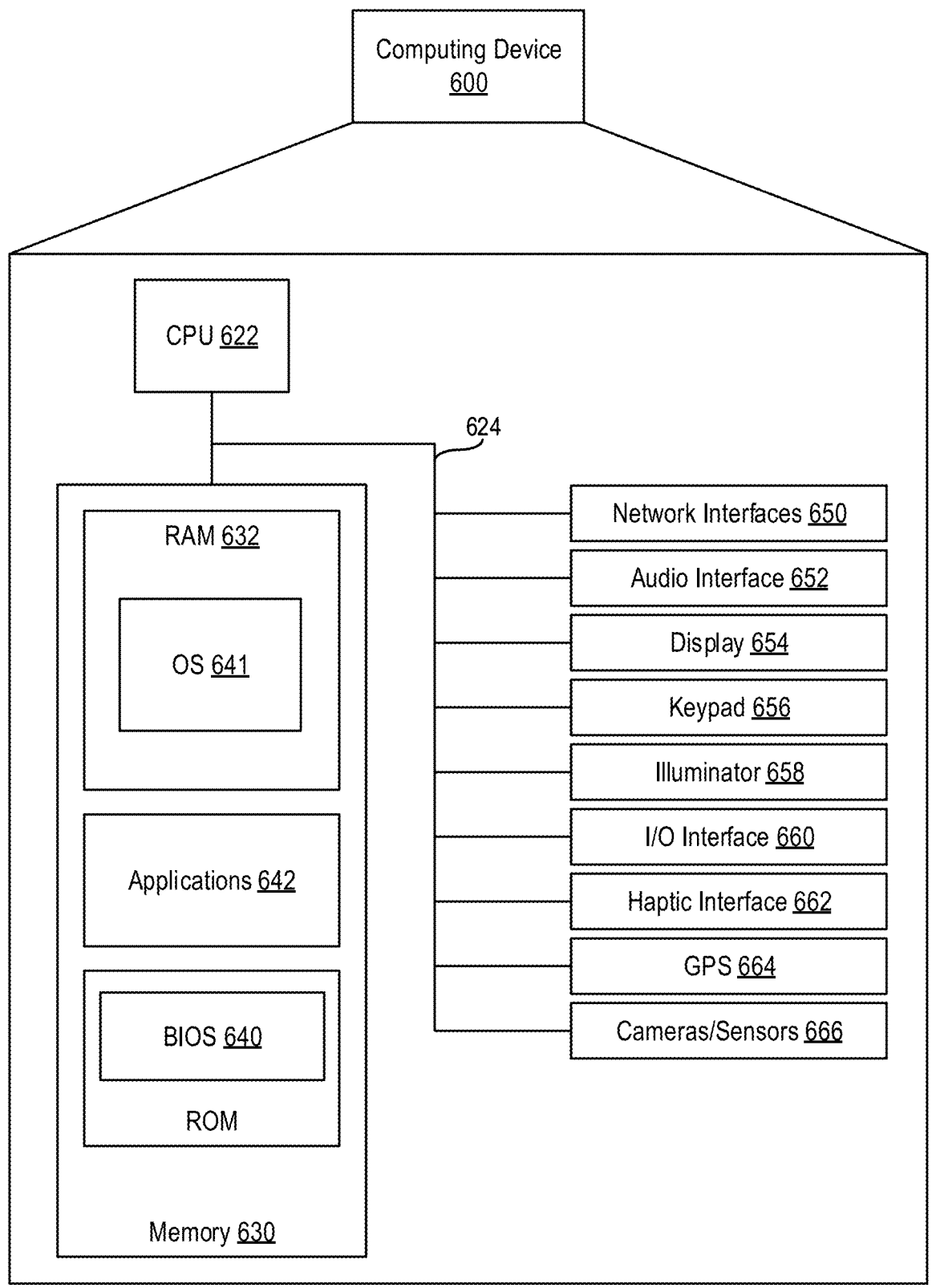
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The computing device (600) can include more or fewer components than those shown in FIG. 6, depending on the deployment or usage of the device (600). For example, a server computing device, such as a rack-mounted server, may not include audio interfaces (652), displays (654), keypads (656), illuminators (658), haptic interfaces (662), Global Positioning Service (GPS) receivers (664), or cameras/sensors (666). Some devices can include additional components not shown, such as graphics processing unit (GPU) devices, cryptographic co-processors, artificial intelligence (AI) accelerators, or other peripheral devices.

As shown in the figure, the device (600) includes a central processing unit (CPU) (622) in communication with a mass memory (630) via a bus (624). The computing device (600) also includes one or more network interfaces (650), an audio interface (652), a display (654), a keypad (656), an illuminator (658), an input/output interface (660), a haptic interface (662), an optional global positioning systems (GPS) receiver (664) and a camera(s) or other optical, thermal, or electromagnetic sensors (666). Device (600) can include one camera/sensor (666) or a plurality of cameras/sensors (666). The positioning of the camera(s)/sensor(s) (666) on the device (600) can change per device (600) model, per device (600) capabilities, and the like, or some combination thereof.

In some embodiments, the CPU (622) can comprise a general-purpose CPU. The CPU (622) can comprise a single-core or multiple-core CPU. The CPU (622) can comprise a system-on-a-chip (SoC) or a similar embedded system. In some embodiments, a GPU can be used in place of, or in combination with, a CPU (622). Mass memory (630) can comprise a dynamic random-access memory (DRAM) device, a static random-access memory device (SRAM), or a Flash (e.g., NAND Flash) memory device. In some embodiments, mass memory (630) can comprise a combination of such memory types. In one embodiment, the bus (624) can comprise a Peripheral Component Interconnect Express (PCIe) bus. In some embodiments, the bus (624) can comprise multiple busses instead of a single bus.

Mass memory (630) illustrates another example of computer storage media for the storage of information such as computer-readable instructions, data structures, program modules, or other data. Mass memory (630) stores a basic input/output system ("BIOS") (640) for controlling the low-level operation of the computing device (600). The mass memory also stores an operating system (641) for controlling the operation of the computing device (600)

Applications (642) can include computer-executable instructions which, when executed by the computing device (600), perform any of the methods (or portions of the methods) described previously in the description of the preceding Figures. In some embodiments, the software or programs implementing the method embodiments can be read from a hard disk drive (not illustrated) and temporarily stored in RAM (632) by CPU (622). CPU (622) can then read the software or data from RAM (632), process them, and store them to RAM (632) again.

The computing device (600) can optionally communicate with a base station (not shown) or directly with another computing device. Network interface (650) is sometimes known as a transceiver, transceiving device, or network interface card (NIC).

The audio interface (652) produces and receives audio signals such as the sound of a human voice. For example, the audio interface (652) can be coupled to a speaker and microphone (not shown) to enable telecommunication with others or generate an audio acknowledgment for some action. Display (654) can be a liquid crystal display (LCD), gas plasma, light-emitting diode (LED), or any other type of display used with a computing device. Display (654) can also include a touch-sensitive screen arranged to receive input from an object such as a stylus or a digit from a human hand.

Keypad (656) can comprise any input device arranged to receive input from a user. Illuminator (658) can provide a status indication or provide light.

The computing device (600) also comprises an input/output interface (660) for communicating with external devices, using communication technologies, such as USB, infrared, Bluetooth®, or the like. The haptic interface (662) provides tactile feedback to a user of the client device.

The optional GPS receiver (664) can determine the physical coordinates of the computing device (600) on the surface of the Earth, which typically outputs a location as latitude and longitude values. GPS receiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) can communicate through other components, provide other information that can be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter can be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms can have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology can be understood at least in part from usage in context. For example, terms such as "and," "or," or "and/or," as used herein can include a variety of meanings that can depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium can comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes can be made thereto, and additional embodiments can be implemented without departing from the broader scope of the disclosed embodiments as set forth in the claims that follow. The specification and drawings are accordingly to be regarded in an illustrative rather than restrictive sense.

What is claimed is:

1. A method comprising:
    initiating, at a serving base station, scheduling for a resource element in a slot for a first user equipment (UE);
    determining, by the serving base station, a neighboring base station associated with a second UE based on measurement data received from the first UE;
    determining, by the serving base station, a type of interference associated with the neighboring base station and the slot, wherein the type of interference is identified based on conflicting cellular transmission types used by the serving base station and the neighboring base station;
    identifying, by the serving base station, an outer loop link adaptation (OLLA) value associated with the type of interference based on a lookup performed using mapping of types of interference to corresponding OLLA values;
    computing, by the serving base station, an effective data rate based at least in part on the OLLA value; and
    completing, by the serving base station, the scheduling using the effective data rate.

2. The method of claim 1, wherein the type of interference is at least one of New Radio (NR) to NR interference, Long-Term Evolution (LTE) to NR interference, and NR to LTE interference.

3. The method of claim 1, wherein the type of interference is at least one of CRS (Cell Reference Signal) to CRS interference, Non-CRS to CRS interference, CRS to Non-CRS interference, and Non-CRS to Non-CRS interference.

4. The method of claim 1 wherein determining the type of interference comprises determining a boosting level or transmission power level of one or more transmissions by the neighboring base station.

5. The method of claim 1, wherein determining the type of interference associated with the neighboring base station comprises reading an interference data structure sent by the neighboring base station.

6. The method of claim 1, wherein computing an effective data rate based on the OLLA value comprises computing an adjusted channel quality indicator (CQI) value using the OLLA value and accessing a modulation coding scheme (MCS) table to identify a modulation and coding scheme.

7. The method of claim 1, further comprising:
    receiving, at the serving base station, an acknowledgment from the first UE, the acknowledgment transmitted in response to a data transmission;
    determining, by the serving base station, a type of interference based on an interference region associated with the data transmission; and
    selecting and updating, by the serving base station, an OLLA set based on the type of interference.

8. The method of claim 1, wherein completing the scheduling comprises selecting an interference region based on an interference data structure shared between the serving base station and the neighboring base station, the interference region selected based on a detected geometry of the first UE.

9. A non-transitory computer-readable storage medium for storing instructions capable of being executed by a processor, the instructions defining steps of:
    initiating scheduling for a resource element in a slot for a first user equipment (UE);

determining a neighboring base station associated with a second UE based on measurement data received from the first UE;

determining a type of interference associated with the neighboring base station and the slot, wherein the type of interference is identified based on conflicting cellular transmission types used by the processor and the neighboring base station;

identifying an outer loop link adaptation (OLLA) value associated with the type of interference based on a lookup performed using mapping of types of interference to corresponding OLLA values;

computing an effective data rate based on the OLLA value; and completing the scheduling using the effective data rate.

10. The non-transitory computer-readable storage medium of claim 9, wherein the type of interference is at least one of New Radio (NR) to NR interference, Long-Term Evolution (LTE) to NR interference, and NR to LTE interference.

11. The non-transitory computer-readable storage medium of claim 9, wherein determining the type of interference associated with the neighboring base station comprises reading an interference data structure sent by the neighboring base station.

12. The non-transitory computer-readable storage medium of claim 9, the instructions further defining steps of:

receiving an acknowledgment from the first UE, the acknowledgment transmitted in response to a data transmission;

determining a type of interference based on an interference region associated with the data transmission; and selecting and updating an OLLA set based on the type of interference.

13. The non-transitory computer-readable storage medium of claim 9, wherein completing the scheduling comprises selecting an interference region based on an interference data structure shared between a serving base station and the neighboring base station, the interference region selected based on a detected geometry of the first UE.

14. A device comprising:
a processor configured to:
initiate scheduling for a resource element in a slot for a first user equipment (UE);

determine a neighboring base station associated with a second UE based on measurement data received from the first UE;

determine a type of interference associated with the neighboring base station and the slot, wherein the type of interference is identified based on conflicting cellular transmission types used by the processor and the neighboring base station;

identify an outer loop link adaptation (OLLA) value associated with the type of interference based on a lookup performed using mapping of types of interference to corresponding OLLA values;

compute an effective data rate based on the OLLA value; and complete the scheduling using the effective data rate.

15. The device of claim 14, wherein the type of interference is at least one of New Radio (NR) to NR interference, Long-Term Evolution (LTE) to NR interference, and NR to LTE interference.

16. The device of claim 14, wherein determining the type of interference associated with the neighboring base station comprises reading an interference data structure sent by the neighboring base station.

17. The device of claim 14, the processor further configured to:

receive an acknowledgment from the first UE, the acknowledgment transmitted in response to a data transmission;

determine a type of interference based on an interference region associated with the data transmission; and select and update an OLLA set based on the type of interference.

* * * * *